United States Patent
Stange et al.

(10) Patent No.: US 6,405,023 B1
(45) Date of Patent: Jun. 11, 2002

(54) BATTERY PACKAGING SYSTEM

(75) Inventors: Richard Stange; Phil Rhoton, both of Oceanside; Tony Ornelas, San Diego, all of CA (US)

(73) Assignee: Denso Corporation, Aichi-Ken (JP)

( * ) Notice: Subject to any disclaimer, the term of this patent is extended or adjusted under 35 U.S.C. 154(b) by 0 days.

(21) Appl. No.: 09/205,352

(22) Filed: Dec. 3, 1998

(51) Int. Cl.⁷ .................. H04B 1/02; H04B 1/08; H01M 2/10; H01M 2/00; H01M 2/02
(52) U.S. Cl. ............ 455/90; 455/347; 455/572; D13/103; D13/119; 429/96; 429/100; 429/163; 429/176
(58) Field of Search .................. 455/572, 90, 347, 455/575; D13/119, 103, 118; 429/96, 97, 98, 99, 100, 163, 176

(56) References Cited

U.S. PATENT DOCUMENTS

| | | | | |
|---|---|---|---|---|
| 3,025,021 A | * | 3/1962 | McCluer et al. ......... | 242/118.4 |
| 4,974,538 A | * | 12/1990 | Meriwether ............. | 114/267 |
| 5,064,135 A | * | 11/1991 | Williamson et al. ..... | 242/118.4 |
| D386,742 S | * | 11/1997 | Amero, Jr. et al. ...... | D13/103 |
| D392,614 S | * | 3/1998 | Shimizu et al. .......... | D13/103 |
| D398,580 S | * | 9/1998 | Richards ............... | D13/103 |
| 5,806,830 A | * | 9/1998 | Alvarez ................ | 251/145 |
| D401,554 S | * | 11/1998 | Nagele et al. .......... | D13/103 |
| D405,752 S | * | 2/1999 | Mason ................. | D13/103 |
| D405,753 S | * | 2/1999 | Nuovo et al. .......... | D13/103 |
| D406,098 S | * | 2/1999 | Walter et al. .......... | D13/103 |
| D408,008 S | * | 4/1999 | Richards et al. ........ | D13/103 |

* cited by examiner

*Primary Examiner*—Dwayne Bost
*Assistant Examiner*—Raymond B. Persino
(74) *Attorney, Agent, or Firm*—Fish & Richardson P.C.

(57) ABSTRACT

A battery for a portable phone is formed with a rectangular battery part and a curved flange part. The battery is held into place in the portable phone by bottom connections including nubs and a jagged portion with surfaces that constrain the battery to move in a plane. The battery is placed into the phone nub side first. Then, the battery is pivoted while the nubs are still engaged, to bring the contacts into position and then the battery is clipped into place.

1 Claim, 5 Drawing Sheets

BATTERY PACKAGING SYSTEM

BACKGROUND

It is well known to provide batteries in cellular and other portable telephones. There are many competing objectives for such a battery. The viewed portion of the battery should have good aesthetics However, the battery portion needs to be sized properly to hold the battery cells efficiently. Easy insertion and removal is also desirable. When inserted, the battery must also stay firmly in place in order to maintain good battery contact.

SUMMARY

The present invention teaches a special system for retaining a battery into a cellular phone. This system includes a number of different features which retain the battery into the cellular phone and also provide good aesthetics.

BRIEF DESCRIPTION OF THE DRAWINGS

These and other aspects will be described with reference to the drawings, in which.

DESCRIPTION OF THE PREFERRED EMBODIMENTS

Figure 1:
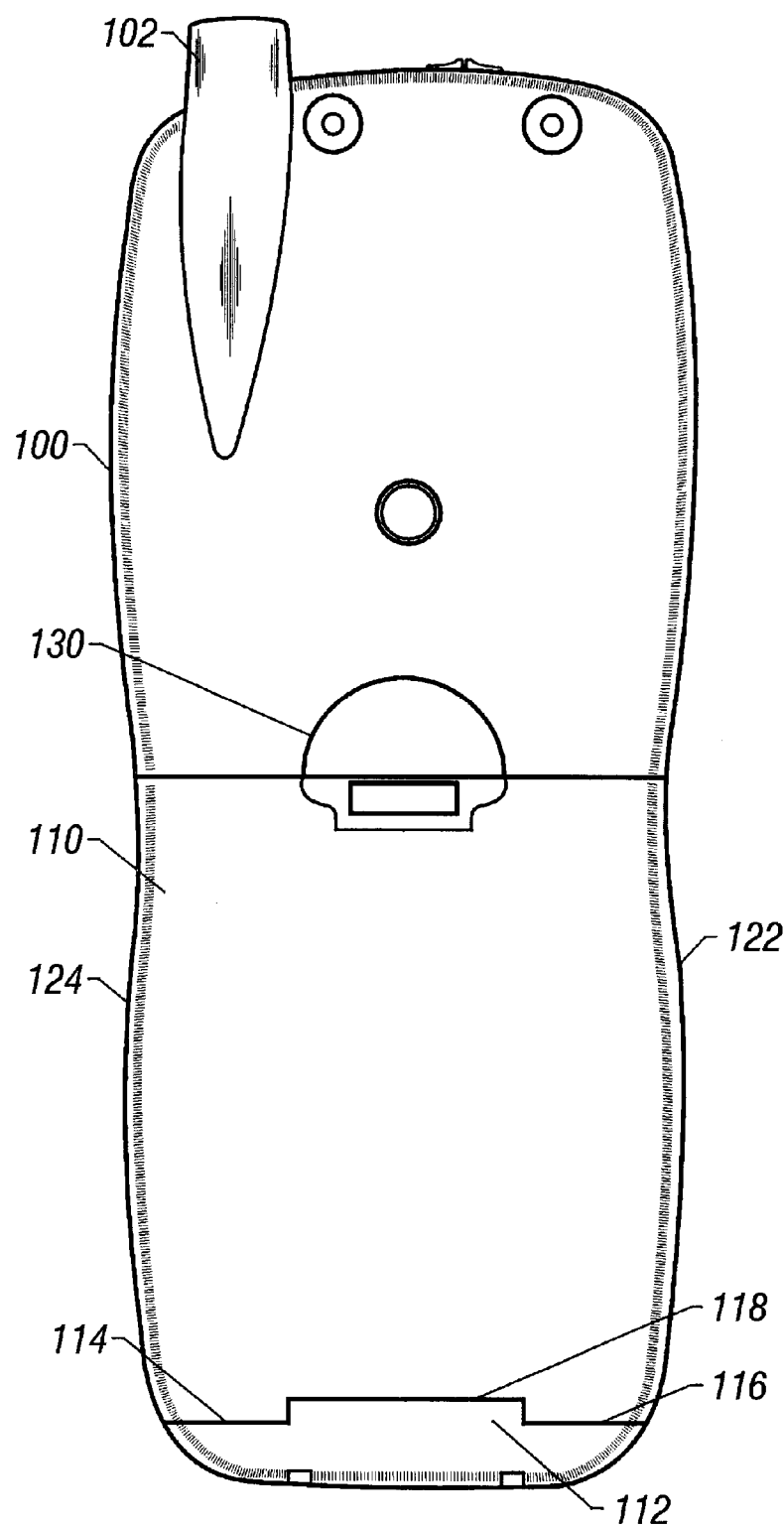
FIG. 1 shows a rear view of the system with the battery installed.
Figure 2:
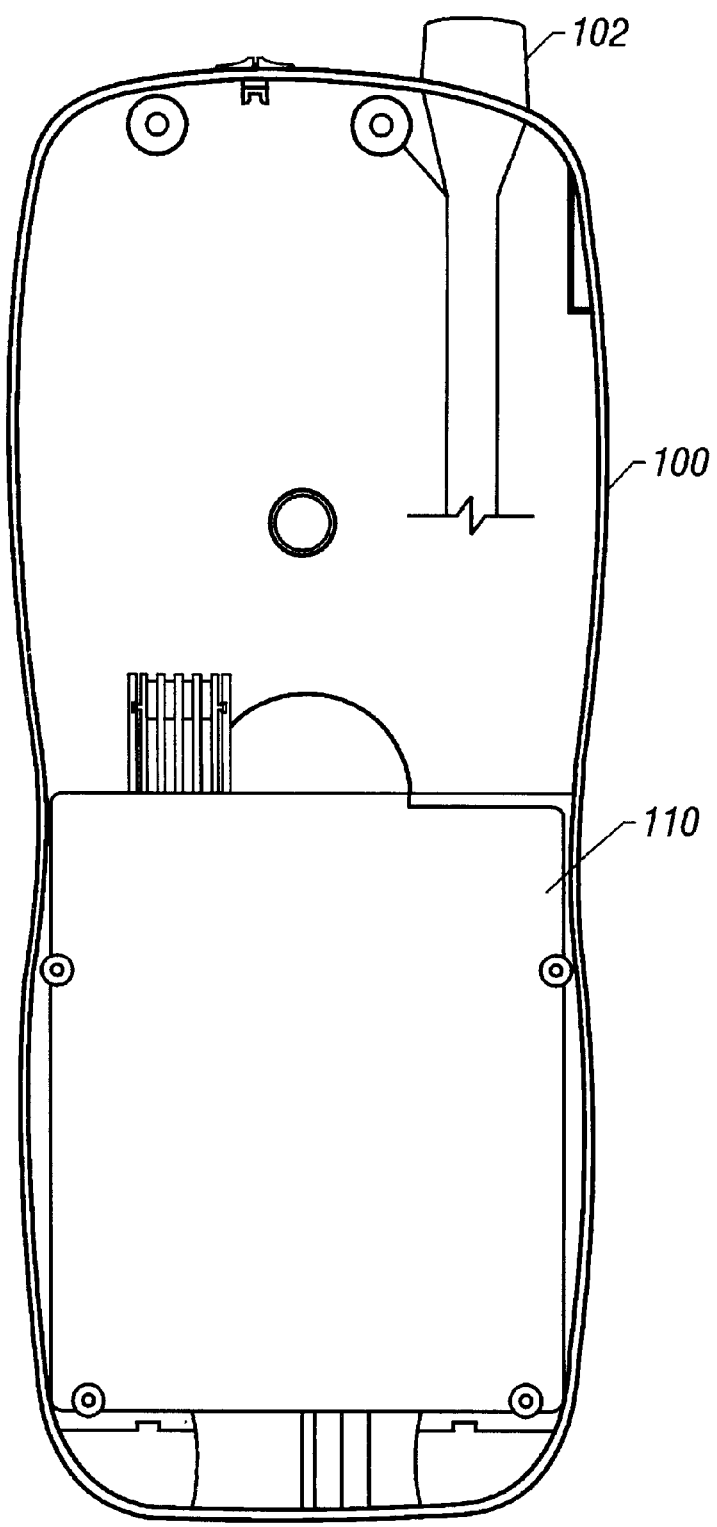
FIG. 2 shows an opposite side of the battery system.

FIG. 1 shows a rear view of the telephone chassis with the battery inserted. The telephone chassis includes a body portion 100 with an antenna mount 102. A battery portion 110 is attached into the telephone. The battery clip portion includes a bottom interface portion 112 which includes a jag-shaped area as formed from lowered areas 114, 116 and a raised area 118. The battery has corresponding jag-shaped surfaces to mate the battery in place in a way that allows the battery to pivot as explained herein.

The telephone chassis and battery also include a clip portion 130. This allows the battery to clip in place. The battery portion also includes curved outer surfaces 122, 124 defining the "viewed" edge of the battery.

Figure 3:
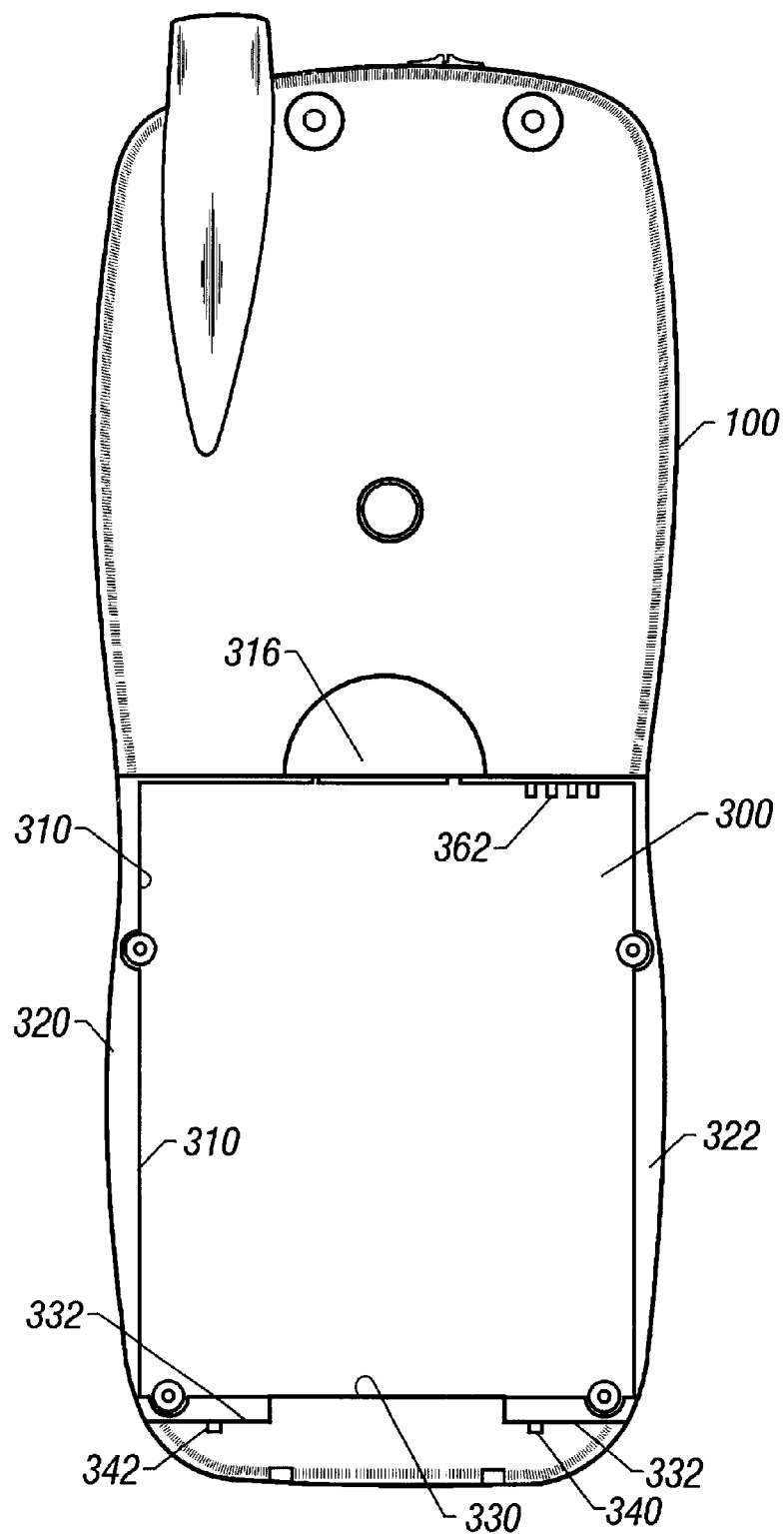
FIG. 3 shows the device without the battery installed.
Figure 4:
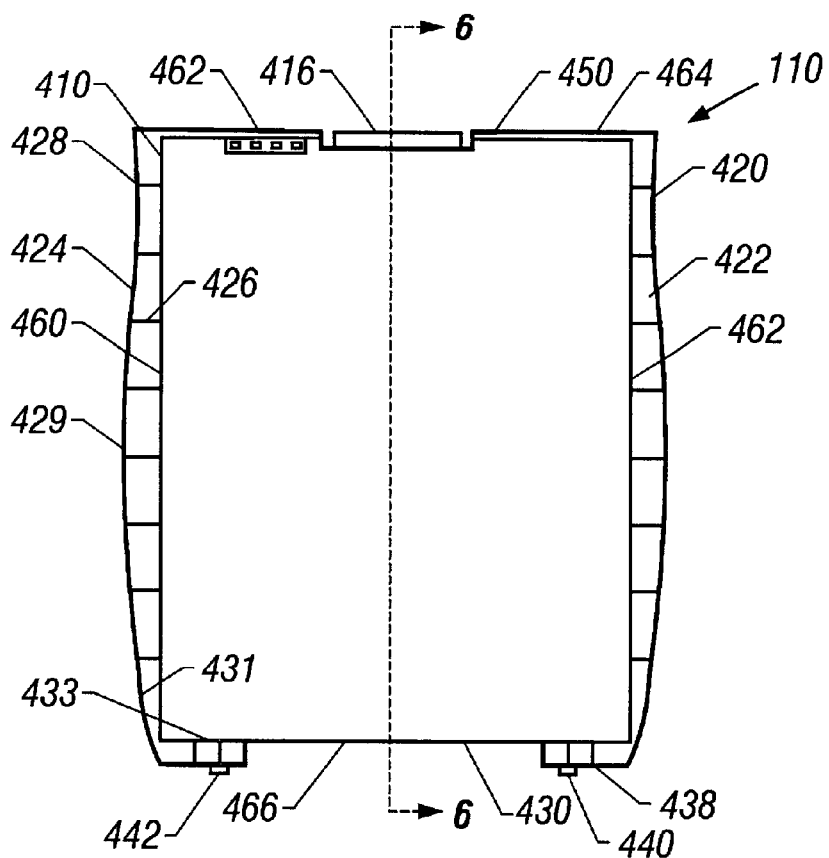
FIG. 4 shows the corresponding battery.

FIGS. 3 and 4 respectively show the telephone chassis when the battery portion in FIG. 4 is removed from the telephone chassis in FIG. 3. The battery portion in FIG. 4 fits into the telephone chassis.

As shown in FIG. 3, the telephone chassis 100 includes an inner cavity 300. This cavity is sized to contain the outer perimeter of battery 110, the "unviewed" part of the battery. The inner cavity 300 includes an inner rectangular cavity portion 310. A curved flange receiving portion 320 surrounds the inner cavity portion. The cavity receiving portion 310 is rectangular to fit relative to the main portion 410 of the battery 110 which is also rectangular. The curved flange receiving portion mates with the curved outer edge 424 of the battery.

Figure 6:
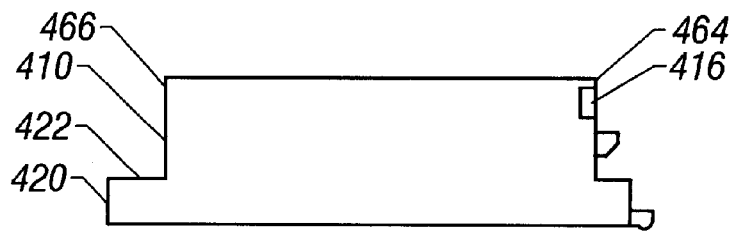
FIg. 6 shows a cross sectiona of the battery.

A cross section of the battery in FIG. 4 along the line 4—4 is shown in FIG. 6. Note that the battery generally includes the main portion 410 which holds the battery and which is generally rectangular with a first surface 460, a parallel second surface 462, a third surface 464 perpendicular to the first and second surfaces, and a fourth surface 466 parallel to the third surface. A flange portion 420 is wider than the battery. The flange portion 420 does not hold any battery material, but rather only surrounds the battery, aligning it properly within the cavity 310 and providing an ornamental aspect.

Figure 5:
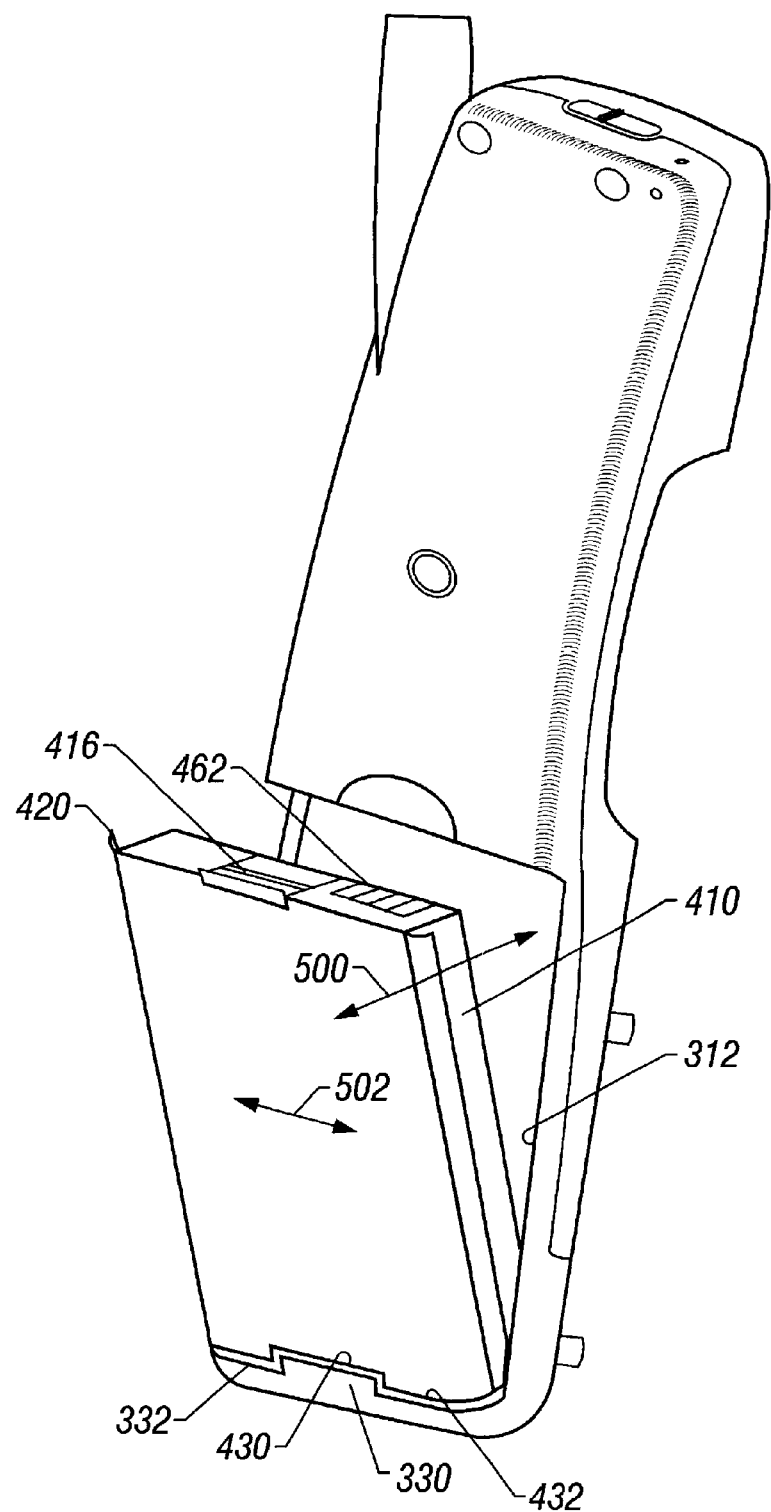
FIG. 5 shows a perspective view of the battery being removed from the device.

When properly provided in the cavity 310, the side walls 410 of the unviewed part of the battery abut against or close to the corresponding walls 312 of the inner cavity. The outer flange 420 also includes a bottom surface 422 which presses against a corresponding flange stop surface 322 on the telephone body. FIG. 5 shows the battery and how it fits into the cavity.

The jagged portion on the bottom-most surface of the battery is formed by two lowered areas 114, 116 defining a flange and an inward extending portion 430, and outward extending portion 432. FIG. 5 shows how the inward extending portions 430 and outward extending portions 432 on the battery mate with corresponding portions 330 and 332 on the jag on the housing. This connection of jag on the battery to jag on the chassis prevents side-to-side motion of the battery relative to the chassis, e.g. in the direction shown in arrow 502. The battery also includes downwardly extending nub portions 440, 442 which extend downward from the bottom surface of the battery, and which respectively mate with corresponding nub portion holes 340, 342 in the chassis.

In operation, and while not viewable in FIG. 5, first the nub portions 440, 442 are inserted into corresponding holes 340, 342 in FIG. 3. This initially orients the battery relative to the chassis. At the same time, the jags are brought into contact by bringing the inwardly extending portion 430 on the battery against or close to the corresponding portion 330 in the housing. This properly locates the two outwardly-extending portions 432, 433 on the battery against the corresponding outwardly-extending portions 332, 333 on the housing. When in this position, the battery can pivot in the direction shown by arrow 500, bringing the contact end 450 of the battery closer to and farther from the housing by the pivot operation. The battery cannot move in the direction shown by arrow 502 during this pivoting, since it is held in place by both the connection of the nubs 440, 442 and by the inwardly and outwardly extending portions 430/432/433. Hence, the battery is constrained to a plane that is perpendicular to the housing during this time, allowing insertion and removal of the battery.

The battery can be lowered to the position shown in FIG. 1 in which the flanges 420 press against the corresponding flange surfaces 322. At that point, the clip portion 416 on the battery is clamped against a corresponding clip-receiving portion 316 on the chassis. The battery can be tilted in the proper plane constrained by the flange portions to allow insertion and removal. When properly held into place, the contacts 462 on the battery are properly aligned with and held firmly against the corresponding contacts 362 on the housing. The final position, where the battery contacts are located in their final position, is held by the clip portion.

The battery can be removed in the reverse way. First, the spring clip 416 is depressed. The battery is tiled until it is in the position shown in FIG. 5. At this position, the battery can be removed from (or inserted into) its semi-attachment formed by connection of nubs 440, 442, to holes 340, 342, and connection of jag on the battery to jag on the chassis.

The battery flange portions include a solid edge portion 424, and a number of fin portions 426 which extend between the solid edge portion and the actual battery element 410. As shown in FIG. 4, the edge portion 424 has a gently curving shape which is narrowest at a top portion 428, and widens towards the bottom portion 429, finally narrowing again at the bottom-most portion 431. The housing has a similar shape so as to mate with the external portion of the battery. However the battery element itself is rectangular, to accommodate the battery cells.

Although only a few embodiments have been described in detail above, those of ordinary skill in the art will understand that modifications are possible without departing from the teaching noted above. All such modifications are encompassed within the following claims.

What is claimed is:

1. A battery system for a portable telephone comprising:

a battery-containing portion and a flange portion surround said battery-containing portion;

said battery portion having a substantially rectangular outer perimeter, the outer perimeter of the rectangular battery portion having a first surface and a substantially parallel second surface, a third surface, perpendicular to said first and second surfaces and extending therebetween, a fourth surface, parallel to said third surface and also extending between said first and second surfaces, a top surface perpendicular to all of said first through fourth surfaces, and a bottom surface parallel to said first surface;

said first surface including battery contact portions thereon which define an electrical connection portion, and also having a battery clip portion with an extending portion which is movable to depress said extending portion, and releasable to release said extending portion;

a flange portion, separated from said outer perimeter of said battery portion, said flange portion having a curved outer portion extending around at least a portion of said outer perimeter, and a pressing surface spaced from the bottom surface of said battery, such that said bottom surface of said battery portion extends below said pressing surface; and a first extending portion, adjacent said second surface of said battery, having a pair of outwardly extending nub portions, and a jag-shaped portion both adjacent said second surface of said battery, wherein the jag-shaped portion limits the lateral movement of the battery system.

* * * * *